US008005569B2

(12) United States Patent
Kechel

(10) Patent No.: US 8,005,569 B2
(45) Date of Patent: Aug. 23, 2011

(54) INSTALLATION FOR SORTING MAILINGS ACCORDING TO SORTING DIRECTIONS

(75) Inventor: Ottmar Kechel, Stockach (DE)

(73) Assignee: Siemens Aktiengesellschaft, Munich (DE)

( * ) Notice: Subject to any disclaimer, the term of this patent is extended or adjusted under 35 U.S.C. 154(b) by 633 days.

(21) Appl. No.: 12/085,077

(22) PCT Filed: Oct. 12, 2006

(86) PCT No.: PCT/EP2006/009850

§ 371 (c)(1),
(2), (4) Date: May 15, 2008

(87) PCT Pub. No.: WO2007/057078

PCT Pub. Date: May 24, 2007

(65) Prior Publication Data

US 2009/0276083 A1 Nov. 5, 2009

(30) Foreign Application Priority Data

Nov. 21, 2005 (DE) ........................ 10 2005 055 763

(51) Int. Cl.

| | |
|---|---|
| ***G06K 9/00*** | (2006.01) |
| ***B07C 1/00*** | (2006.01) |
| ***B65G 47/10*** | (2006.01) |
| ***B65G 43/08*** | (2006.01) |
| ***B65G 47/00*** | (2006.01) |

(52) U.S. Cl. ... 700/226; 209/584; 209/700; 198/370.01; 198/358; 198/528

(58) Field of Classification Search ........................ None
See application file for complete search history.

(56) References Cited

U.S. PATENT DOCUMENTS

2006/0102529 A1* 5/2006 Wilke .......................... 209/584

FOREIGN PATENT DOCUMENTS

| | | | |
|---|---|---|---|
| DE | 103 05 847 | B3 | 8/2004 |
| DE | 10 2004 033 564 | B3 | 3/2006 |
| EP | 0 949 015 | A2 | 10/1999 |
| EP | 949015 | A2 * | 10/1999 |

* cited by examiner

*Primary Examiner* — Gene Crawford
*Assistant Examiner* — Yolanda Cumbess

(57) ABSTRACT

Disclosed is an installation for sorting incoming mailings which are assigned to a first plurality of first preselected directions or a second plurality of second remaining sorting directions, according to which the mailings are distributed to receptacles of a track, each mailing being deposited into one of several first receptacles for the first plurality of first preselected sorting directions or into at least one of the other receptacles for the second plurality of second remaining sorting directions. At least one external receptacle from an additional track is replaced with a receptacle from one of the preselected first sorting directions of the track via an interface at least during one passage of the track, the additional track is used as a storage device for the receptacles, and replaced receptacles can be redirected to the respective track thereof via the interface.

16 Claims, 2 Drawing Sheets

INSTALLATION FOR SORTING MAILINGS ACCORDING TO SORTING DIRECTIONS

CROSS REFERENCE TO RELATED APPLICATIONS

This application is the US National Stage of International Application No. PCT/EP2006/009850, filed Oct. 12, 2006 and claims the benefit thereof. The International Application claims the benefits of German application No. 10 2005 055 763.5 filed Nov. 21, 2005, both of the applications are incorporated by reference herein in their entirety.

FIELD OF INVENTION

The invention relates to an installation for sorting mailings according to sorting directions as claimed in the claims.

BACKGROUND OF THE INVENTION

There is currently a desire to ensure the sorting of mailings, such as mail items or packages, according to as many sorting directions as possible automatically and with a high throughput. In this respect an installation with a track of receptacles is known, said receptacles being assigned respectively to a sorting direction and with the mailings being allocated to and deposited in said receptacles.

FIG. 1 shows such an installation (see also DE 103 05 847 B3), which allows the sorting of incoming objects or mailings G1, G2 by means of loading facilities or feeders F1, F2. The number and output of the feeders F1, F2 hereby determines a maximum throughput of mailings to be sorted. The mailings G1, G2 are deposited in circulating bags or cassettes A1, A2, . . . , AX of a first track LA by means of the (laterally) arranged appropriate feeders F1, F2. The sorting direction of a mailing is hereby already known. The mailing is transported in its bag along the track LA, until the bag is located in front of an empty storage compartment S1, S2, . . . , SX, into which the mailing is passed. This storage compartment hereby operates as a buffer S between the first track LA and a second track LB, which has circulating receptacles B1, B2, . . . , B5, C1, C2. The mailings from the buffer S are allocated according to the sorting directions by transferring the mailings to the various receptacles, when a corresponding receptacle circulates in front of the required storage compartment of the buffer S. Each of said receptacles is assigned a sorting direction, which designates for example a predominant sorting direction, for a large city perhaps, or a further remaining sorting direction, for smaller districts for example. The large number/volume of mailings for predominant sorting directions compared with mailings with remaining sorting directions means that in practice a further larger plurality n (n=2, 3, 4, . . . ) of receptacles B1, B2, . . . , B5 is used for predominantly preselected sorting directions in track LB and a smaller second number m (m−1, 2, 3, . . . and m<n) of further receptacles C1, C2 is used for the remaining sorting directions. Therefore all mailings from the buffer S are individually allocated to or deposited in the receptacles B1, B2, . . . , B5 of the second track LB according to the first preselected sorting directions but the remaining mailings are not sorted individually but are for example stacked according to the second remaining sorting directions due to the limited number of receptacles C1, C2 still available in the second track LB.

Therefore in this first step the mailings with predominant sorting directions are sorted completely while the further mailings with remaining sorting directions are deposited in one or a few receptacles, without being sorted individually.

The remaining mailings therefore still have to undergo a more refined sorting process, for example by then being fed back into the feeders F1, F2 with more refined setting of the assigned sorting directions at the two tracks LA, LB and at the buffer S. This further refined sorting operation can take place at a specific time, for example after the mailings with predominant sorting directions have already been sorted. This process is generally carried out manually, when an operator of the installation determines that the number of incoming mailings with predominant sorting directions is decreasing. If this is not the case, because a new load of mailings with predominant sorting directions comes in, these mailings must be sorted later. In other words the installation can generally only sort overall as a maximum with half the throughput for example.

SUMMARY OF INVENTION

The object of the invention is to specify an installation for the efficient sorting of mailings into receptacles of a track, with the number of receptacles in the track being restricted and/or smaller than the number of sorting directions actually required.

According to the invention the object is achieved by the features of the claims.

An installation is proposed for sorting incoming mailings (with constant or variable supply throughput), with which the mailings are assigned to a first plurality n (n=2, 3, . . . ) of first preselected predominant sorting directions or a second plurality m (m=1, 2, 3, . . . ) of second remaining sorting directions and the mailings are allocated to different receptacles of a track according to the sorting directions, with each mailing being deposited in one of a number of first receptacles for the first plurality of preselected sorting directions or in at least one of the further receptacles for the second plurality of remaining sorting directions. Because at least one external receptacle from an additional track is replaced with a receptacle for one of the preselected sorting directions of the track at least during one passage of the track and by way of an interface, there is no need for example for the additional supply of mailings for remaining sorting directions. The second plurality m of additional receptacles can hereby be as high as required, in some instances greater than the first plurality n.

With (rough) knowledge of the predominant and remaining sorting directions, preferably their estimated mailing volume per hour and per receptacle (=end point of the sorting process), it is possible likewise to increase the overall throughput of the installation significantly.

There are many further advantages, as follows:

A) It is possible for mailings to be sorted directly to the additional receptacles (=end points of external location) without them having to be input again with a material input. This inputting into a material input is associated with by far the greatest personnel outlay in respect of processing. This personnel outlay can be reduced with the aid of the present invention. It is not possible to avoid the fact that repeated feeding in and out of the external additional receptacles causes the throughput of an otherwise throughput-optimized sorting installation to be reduced to a certain degree but the labor-saving effect outweighs this. In the case of an installation which is assumed to have an original throughput of 100% for predominant sorting directions, the throughput is reduced (increased) as a result by 20% for example. If we take into account that when operating the installation, with for example 5 operators being required for maximum throughput, for example with only 4 operators at the installation, productivity can remain identical with a larger number of end points.

B) Using the present invention it is possible to implement a sorting installation with only 200 end points in the first track and 100 externally located end points in the additional track, which are only fed to the already existing sorting installation as required, rather than an expensive and more complex installation with for example 300 end points (=receptacles).

C) During operation of the sorter (=sorting installation) it is possible to select a sorting function with either a large number of receptacles and lower throughput or a sorting function with fewer receptacles and higher throughput as required (as a function of the time window available and as a function of the desired number of end points). This is particularly advantageous in a mail center as during the day all the mail shots can be allocated in as refined a manner as possible with moderate throughput (only one feed process). In the evening, when the mailings have to be dispatched at a specific time, the reduced (original) number of compartments is then used for the predominant sorting directions with a high throughput.

Advantageous embodiments of the invention are set out in the subclaims.

In particular both tracks have a total number n+m of receptacles for predominant and remaining sorting directions, which can be replaced in pairs between the two tracks. In other words a receptacle for a remaining sorting direction can also be replaced with a different receptacle for a further remaining sorting direction. All replacement options between receptacles of the two tracks are therefore permitted, depending on the distribution of the sorting directions (predominant/remaining) of the mailings coming into the installation.

The second track can be implemented by means of simple linear or ring storage unit.

The interface can be implemented according to different replacement principles between the two tracks. It can for example comprise a switchable branch point and a feed point, thereby forming a simple track extension of the first track. It can also be a further receptacle-selective replacement facility on adjacent sections of the two tracks. Many types of implementation are possible but for reasons of clarity the subject matter of the invention will not disclose all such aspects.

The interface between the two tracks can be connected to a control module, which activates the interface as a function of actually occurring addresses or destinations of the mailings, which are random. The throughput for sorting mailings with predominant sorting directions is hereby only slightly reduced but statistically speaking a possible accumulation or unwanted occupation of space by mailings with non-predominant sorting directions in a buffer S or in the first track according to FIG. 1 is avoided.

One alternative is for the control module to activate the interface with a periodic signal. In other words the throughput is regulated according to the temporal (e.g. daytime and night-time) relationship between predominant and remaining sorting directions, so that the most efficient sorting operation is carried out for all possible mailings with an at least decelerated throughput for the predominant mailings.

The control module can also activate the interface with a sorting-direction-selective signal. This variant is the most flexible, since it is possible to predict a replacement schedule for the receptacles at least for each passage of the first track from the knowledge of the spectrum of sorting directions of the incoming mailings to be sorted. With this information a signal can be generated in the control module, activating the switching of the interface for existing sorting requirements (e.g. in the buffer). In contrast to a continuous replacement process no external receptacles are hereby added without ensured acceptance of the mailing in the first track. As a result it is ensured in all receptacles circulating along the first track that at least one mailing is deposited in one passage.

The control module is also intended to take into account changes in the throughput of all incoming mailings, in particular changes in the individual pluralities n, m of the sorting directions of incoming mailings. It is thus possible in some instances to achieve a maximum dynamic receptacle assignment with all n+m receptacles either for predominant or for remaining sorting directions.

BRIEF DESCRIPTION OF THE DRAWINGS

The invention is described below in an exemplary embodiment with reference to the drawing, in which.

DETAILED DESCRIPTION OF INVENTION

Figure 1:
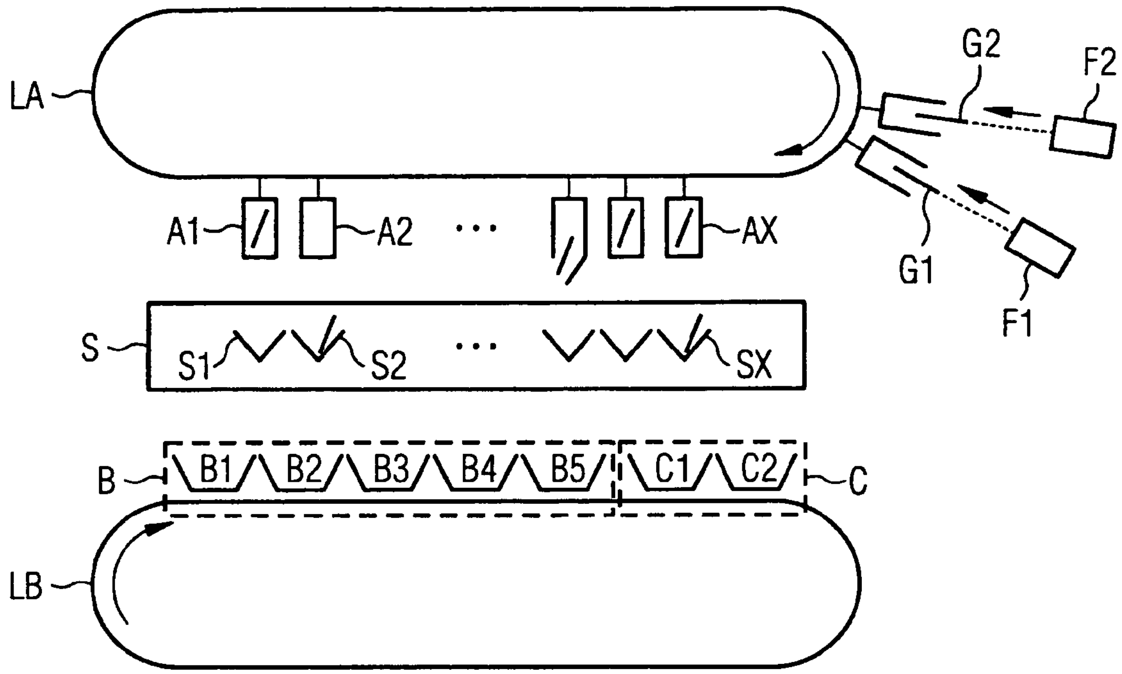
FIG 1 Prior art
FIG. 1 shows an installation according to the prior art.
Figure 2:
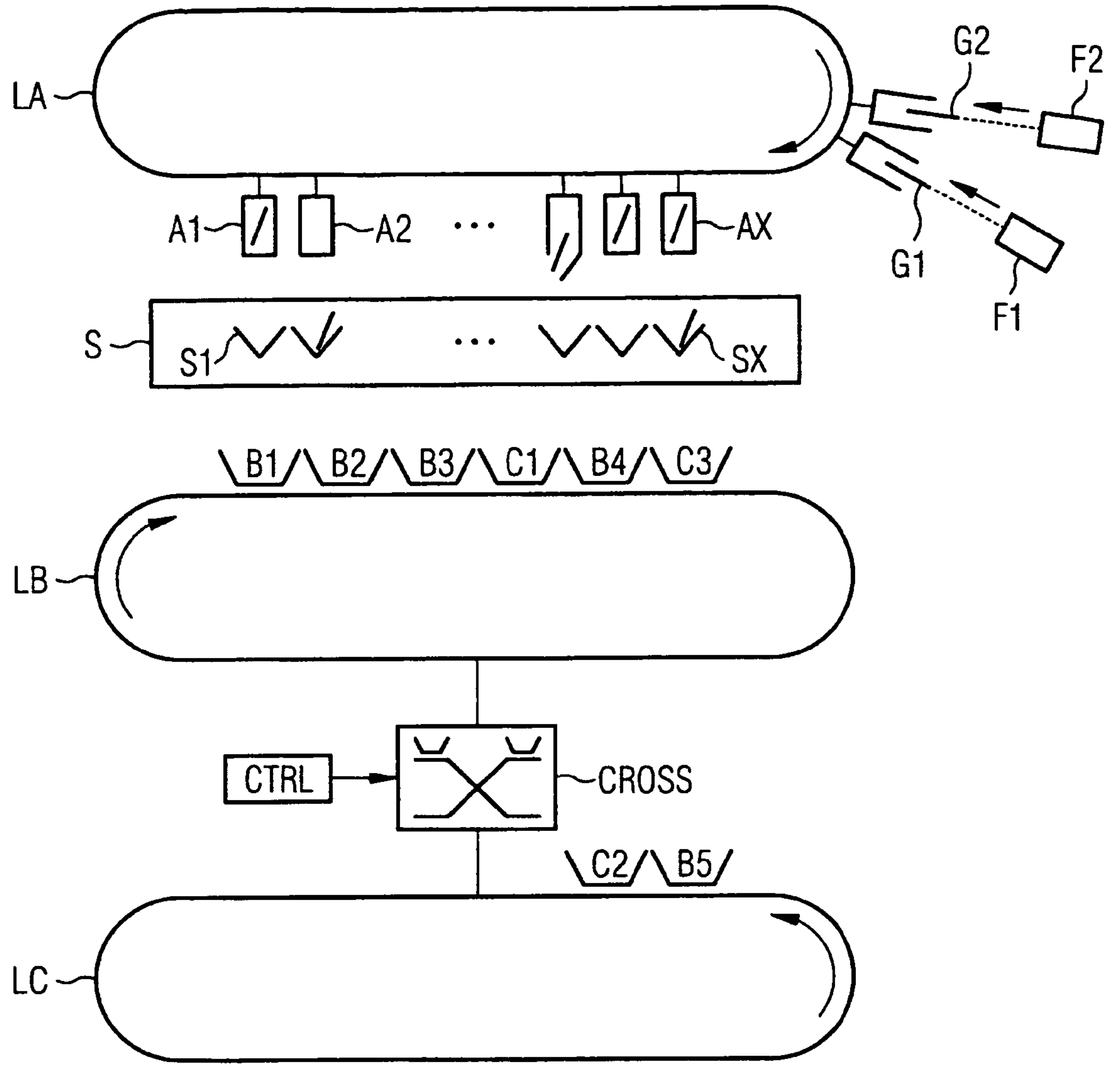
FIG. 2 shows an inventive installation for sorting mailings.

FIG. 2 in principle shows all the technical features of the sorting installation according to FIG. 1. Track LB is now referred to as the first track (track LA and buffer S are not important for an explanation of the inventive subject matter). An interface CROSS for replacing at least one additional receptacle from an external track LC with a receptacle of the first track LB is connected at one point of the first track LB. The interface CROSS is connected to a control module CTRL which can activate and deactivate the interface CROSS in ways already described.

In this example and based on FIG. 1 the interface has been activated once, so that the receptacle B5 originally associated with the first track has been replaced with an additional receptacle C3 of the external track LC. One or a number of storage compartments of the buffer S in each instance with a mailing for the sorting direction assigned to the receptacle C3 can thus be emptied into the receptacle C3 circulating here. This means a reduction in throughput for the sorting direction corresponding to the receptacle B5, but only during one passage of the receptacle C3 along the first track LB. It is then possible to return the receptacle C3 to the external track LC and at the same time the receptacle B5 to its original track LB by way of the interface CROSS. However other replacements can also be undertaken here, if dynamic requirements for individual sorting directions are monitored.

In FIG. 2, in contrast to FIG. 1, the receptacle C2 for an originally remaining (i.e. not predominant) sorting direction is located in the external track LC instead of the first track LB. The receptacle C2 can circulate along the external track LC as in a storage unit, as long as no mailing for its assigned sorting direction in the buffer S is to be deposited. The first track LB therefore has an additional space for a receptacle for a predominant sorting direction.

In a further alternative the external track LC or a further external track is connected to the track LA in FIG. 1 by way of a further interface. The bags A1, . . . , AX in front of the buffer S could therefore deposit the mailings such that the mailings are transferred as a function of the existing or planned available sorting directions in track LB and/or track LC.

With the invention the feeders F1, F2, the tracks LA, LB and the buffer S do not have to be modified. A simple extension of at least one of the tracks LA, LB suffices to increase the throughput of all mailings according to predominant and remaining sorting directions.

If for example the track LB has a throughput of 10,000 mailings per hour for 100 sorting directions (with 100 receptacles), the throughput is halved to 5,000 mailings per hour, if a further 100 sorting directions occur in the buffer S and a further, subsequent sorting operation has to be carried out.

With the present invention and the knowledge that the 100 first predominant sorting directions form approximately 90% of the overall mailing volume per receptacle and the 100 remaining sorting directions form approximately 10% of the overall mailing volume per receptacle, the overall throughput will experience a reduction of only 10% instead of 50%.

The invention claimed is:

1. An installation for sorting incoming mailings comprising:

a plurality of receptacles, wherein one group of receptacles is assigned a first sorting direction and another group of receptacles is assigned a second sorting direction;

a first receptacle track circulating a selected number of the receptacles from each group into which mailings are allocated based on sorting direction, the mailings received from a storage buffer in communication with a feeder track;

an external track circulating a remainder of receptacles not circulating on the first receptacle track which serves as a storage unit for the remainder of receptacles during at least one passage of the first receptacle track; and an interface between the first receptacle track and the external track which is selectively activated to replace and return receptacles to their respective track by way of the interface thereby increasing or decreasing the selected number of the receptacles from each group on the first receptacle track in accordance with sorting direction requirements.

2. The installation as claimed in claim 1, wherein both the first receptacle track and the external track have a total number of receptacles for predominant and remaining sorting directions, which are replaceable in pairs between the two tracks.

3. The installation as claimed in claim 2, wherein the external track is a linear or ring storage unit.

4. The installation as claimed in claim 3, wherein the interface is connected to a control module, which activates the interface as a function of actually occurring addresses or destinations of the mailings, which are random.

5. The installation as claimed in claim 4, wherein the interface is connected to a control module that activates the interface with a periodic signal.

6. The installation as claimed in claim 5, wherein the interface is connected to a control module that activates the interface with a sorting-direction-selective signal.

7. The installation as claimed in claim 6, wherein the interface is connected to a control module that activates the interface as a function of a change in the throughput of incoming mailings.

8. The installation as claimed in claim 7, wherein the interface is connected to a control module that activates the interface as a function of the individual pluralities of the sorting directions of incoming mailings.

9. A method of sorting incoming mailings in a mail sorting installation, comprising:

assigning a plurality of first receptacles to a first plurality of first preselected sorting directions in a first group;

assigning a plurality of further receptacles to a second plurality of second remaining sorting directions in a second group; and assigning each of the incoming mailings to a first plurality of first preselected sorting directions or a second plurality of second remaining sorting directions, based on the receptacle that the mailing is deposited in, circulating on a first receptacle track a selected number of the receptacles from each group into which mailings are allocated based on sorting direction, the mailings received from a storage buffer in communication with a feeder track;

circulating on an external track a remainder of receptacles not circulating on the first receptacle track, wherein the external track which serves as a storage unit for the remainder of receptacles;

selectively activating an interface between the first receptacle track and the external track wherein at least one receptacle from the external track is replaced with at least one receptacle from the first receptacle track during at least one passage of the track and the replaced receptacles are returned to their respective track by way of the interface thereby increasing or decreasing the selected number of the receptacles from each group on the first receptacle track in accordance with sorting direction requirements.

10. The method as claimed in claim 9, wherein both the first receptacle track and the external track have a total number of receptacles for predominant and remaining sorting directions, which are replaceable in pairs between the two tracks.

11. The method as claimed in claim 10, wherein the external track is a linear or ring storage unit.

12. The method as claimed in claim 11, wherein the interface is connected to a control module, which activates the interface as a function of actually occurring addresses or destinations of the mailings, which are random.

13. The method as claimed in claim 12, wherein the interface is connected to a control module that activates the interface with a periodic signal.

14. The method as claimed in claim 13, wherein the interface is connected to a control module that activates the interface with a sorting-direction-selective signal.

15. The method as claimed in claim 14, wherein the interface is connected to a control module that activates the interface as a function of a change in the throughput of incoming mailings.

16. The method as claimed in claim 15, wherein the interface is connected to a control module that activates the interface as a function of the individual pluralities of the sorting directions of incoming mailings.

* * * * *